United States Patent [19]

Brosius et al.

[11] Patent Number: 5,244,976
[45] Date of Patent: Sep. 14, 1993

[54] PARTIALLY CROSSLINKED POLYMER COMPOSITION

[75] Inventors: Sibylle Brosius, Ludwigshafen; Klaus-Dieter Ruempler, Wachenheim; Erhard Seiler, Ludwigshafen; Susanne Hahn, Mannheim; Karl Huber, Frankenthal; Rainer A. Werner, Bad Duerkheim, all of Fed. Rep. of Germany

[73] Assignee: BASF Aktiengesellschaft, Ludwigshafen, Fed. Rep. of Germany

[21] Appl. No.: 847,403

[22] Filed: Mar. 6, 1992

[30] Foreign Application Priority Data

Mar. 9, 1991 [DE] Fed. Rep. of Germany ....... 4107635

[51] Int. Cl.$^5$ ............................................. C08F 8/00
[52] U.S. Cl. ..................................... 525/193; 525/240
[58] Field of Search ................................ 525/193, 240

[56] References Cited

U.S. PATENT DOCUMENTS

3,646,155 2/1972 Scott .
4,160,072 7/1979 Shinkai et al. .
4,652,326 3/1987 Spielau et al. .

FOREIGN PATENT DOCUMENTS

412518 7/1990 European Pat. Off. .
1406680 9/1975 United Kingdom .
1408154 10/1975 United Kingdom .

Primary Examiner—Bernard Lipman
Attorney, Agent, or Firm—Keil & Weinkauf

[57] ABSTRACT

A partially crosslinked polymer composition having a melt flow index of from 0.1 to 50 g/10 min at 230° C. under a weight of 2.16 kg and comprising a) a polymer comprising from 25 to 95% by weight of polypropylene and 5 to 75% by weight of a propylene copolymer with copolymerized $C_2$-$C_{10}$-alk-1-enes, the comonomer content being from 1 to 45% by weight, based on the total polymer, b) an organosilane compound of the formula (I)

$$A_{4-n}SiR_n \qquad (i)$$

where A are identical or different acrylates or methacrylates or vinyl groups, R are identical or different $C_1$-$C_8$-alkoxy or $C_1$-$C_8$-acetoxy groups, and n is 1, 2 or 3, obtainable by reacting the polymer a) with the organosilane compound b) in the presence of a free-radical initiator and in the presence of a condensation catalyst at from 180° to 280° C., and at from 1 to 100 bar and at a mean residence time of the reaction mixture of from 0.2 to 10 minutes, has, in particular, high notched impact strength, increased puncture resistance and improved weld line strength.

5 Claims, No Drawings

PARTIALLY CROSSLINKED POLYMER COMPOSITION

The present invention relates to a partially crosslinked polymer composition having a melt ±low index of from 0.1 to 50 g/10 min at 230° C. under a weight of 2.16 kg and comprising a) a polymer comprising from 25 to 95% by weight of polypropylene and 5 to 75% by weight of a propylene copolymer with copolymerized $C_2$-$C_{10}$-alk-1-enes, the comonomer content being from 1 to 45% by weight, based on the total polymer, b) an organosilane compound of the formula (I)

$$A_{4-n}SiR_n \qquad (I)$$

where A are identical or different acrylates or methacrylates or vinyl groups, R are identical or different $C_1$-$C_8$-alkoxy or $C_1$-$C_8$-acetoxy groups, and n is 1, 2 or 3, obtainable by reacting the polymer a) with the organosilane compound b) in the presence of a free-radical initiator and in the presence of a condensation catalyst at from 180° to 280° C., at from 1 to 100 bar and at a mean residence time of the reaction mixture of from 0.2 to 10 minutes.

The present invention also relates to a process for the preparation of a partially crosslinked polymer composition according to the invention and to the use of this composition for the production of films and moldings.

It is known to first graft polyethylenes and copolymers of ethylene with vinylsilanes and subsequently to crosslink the graft polymer with the aid of a silanol condensation catalyst (DE-A 26 11 491, U.S. Pat. No. 3,646,155, GB-A 1,406,680 and GB-A 1,408,154). In this way, polymers having improved mechanical properties, in particular higher strength, are obtained.

Furthermore, the crosslinking of polypropylene or copolymers of propylene with unsaturated silanes in the presence of a silanol condensation catalyst and in the presence of a peroxide is described in DE-A 33 27 149 and DE-A 35 20 106. The resultant polymers have good low-temperature toughness and high dimensional stability.

Crosslinked polymers have the advantage over uncrosslinked polymers of higher mechanical stability. However, the low melt flow of crosslinked materials means that they cannot be molded by the methods which are usual in plastics technology (H.G. Elias, Makromoleküle, Verlag Hüthig & Wepf, 4th Edition, pages 1000–1003).

For the processing of polymers, it is therefore necessary to ensure that the degree of crosslinking of the polymers is not too high, so that they can still be molded using the equipment which is customary in plastics technology.

It is an object of the present invention to develop a polymer composition which combines the advantages of crosslinked polymers with respect to their mechanical strength with those of uncrosslinked polymers with respect to their good processing properties and which can in addition be prepared in a simple manner.

We have found that this object is achieved by the partially crosslinked polymer compositions defined at the outset.

The partially crosslinked polymer compositions according to the invention have a melt flow index of from 0.1 to 50 g/10 min at 230° C. under a weight of 2.16 kg. The melt flow index corresponds to the amount of polymer pressed out of a tester standardized in accordance with DIN 53 735 within 10 minutes at 230° C. under a weight of 2.16 kg. Particular preference is given to partially crosslinked polymer compositions whose melt flow index is from 0.1 to 40 g/10 min at 230° C. under a weight of 2.16 kg.

The polymer compositions according to the invention contain a polymer a) comprising from 25 to 95% by weight of polypropylene and from 5 to 75% by weight of a propylene copolymer with copolymerized $C_2$-$C_{10}$-alk-1-enes, the comonomer content being from 1 to 45% by weight, based on the total polymer. Preferred polymer compositions are those in which polymer a) comprises from 35 to 90% by weight of polypropylene and from 10 to 65% by weight of a propylene copolymer, the content of copolymerized $C_2$-$C_{10}$-alk-1-enes being from 1 to 40% by weight, based on the total polymer. For the purposes of the present invention, copolymerized $C_2$-$C_{10}$-alk-1-enes are, in particular, ethylene, but-1-ene, pent-1-ene, hex-1-ene, hept-1-ene and oct-1-ene or mixtures of these comonomers, preference being given to ethylene and but-1-ene.

The preparation of the polymer a) to be used according to the invention can be carried out in conventional reactors used for the polymerization of propylene, either batchwise or preferably continuously. Examples of suitable reactors are continuously operated stirred reactors, it also being possible to employ a series of consecutive stirred reactors. The reactors contain a fixed bed of finely divided polymer which is usually kept in motion by stirring.

The process can be carried out using the Ziegler-Natta catalysts which are usual in polymerization technology. These catalysts contain, inter alia, cocatalysts in addition to a titanium-containing solid component. Suitable cocatalysts are aluminum compounds together with electron-donor compounds.

The titanium-containing solid component is generally prepared using, as the titanium compound, a halide or alkoxide of trivalent or tetravalent titanium, preference being given to titanium chlorides, in particular titanium tetrachloride. The titanium-containing solid component advantageously contains a finely divided carrier, for which purpose silica, alumina and aluminum silicates of the empirical formula $SiO_2 a Al_wO_3$ where a is from 0.001 to 2, in particular from 0.01 to 0.5, have proven suitable.

The preferred carriers have a particle diameter of from 0.1 to 1,000 μm, in particular from 10 to 300 μm, a pore volume of from 0.1 to 10 cm³/g, in particular from 1.0 to 5.0 cm³/g, and a specific surface area of from 10 to 1,000 m²/g, in particular from 100 to 500 m²/g.

The preparation of the titanium-containing solid component is also carried out using, inter alia, compounds of magnesium, in particular magnesium halides and alkylmagnesium, arylmagnesium, alkoxymagnesium and aryloxymagnesium compounds, preferably magnesium dichloride, magnesium dibromide and di($C_1$–$C_{10}$-alkyl)-magnesium compounds. In addition, the titanium-containing solid component may also contain halogen, preferably chlorine or bromine.

Furthermore, the titanium-containing solid component also contains electron-donor compounds, for example monofunctional or polyfunctional carboxylic acids, carboxylic anhydrides and carboxylic esters, furthermore ketones, ethers, alcohols, lactones, and organophosphorus and organosilicon compounds. Preferred electron-donor compounds within the titanium-containing solid component are phthalic acid derivatives of the general formula II

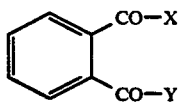

where X and Y are each chlorine or $C_1$- to $C_{10}$-alkoxy or together are oxygen. Particularly preferred electron-donor compounds are phthalic esters, where X and Y are $C_1$-$C_8$-alkoxy, for example methoxy, ethoxy, propoxy or butoxy.

Other preferred electron-donor compounds within the titanium-containing solid component are, inter alia, diesters of 3- or 4-membered, substituted or unsubstituted cycloalkyl-1,2-dicarboxylic acids, and monoesters of substituted or unsubstituted benzophenone-2-carboxylic acids. The hydroxyl compounds used in these esters are alcohols which are customary in esterification reactions, inter alia $C_1$- to $C_{15}$-alkanols, $c_5$- to $C_7$-cycloalkanols which can themselves carry $C_1$- to $C_{10}$-alkyl groups, and furthermore phenols, naphthols and the $C_1$-$C_{10}$-alkyl derivatives of these compounds.

The titanium-containing solid component can be prepared by conventional methods, for example as described, inter alia, in EP-A 45 975, EP-A 86 473, EP-A 171 200, GB-A 2,111,066 and U.S. No. 4,857,613.

The titanium-containing solid component is preferably prepared by the three-step process described below.

In the first step, a solution of the magnesium-containing compound in a liquid alkane is first added to a finely divided carrier, preferably silica or $SiO_2.aAl_2O_3$ having a water content of from 0.5 to 5% by weight, where a is from 0.001 to 2, in particular from 0.01 to 0.5, and this mixture is then stirred for from 0.5 to 5 hours at from 10° to 120° C.

From 0.1 to 1 mol of the magnesium compound is preferably employed per mole of the carrier. A halogen or a hydrogen halide, in particular chlorine or hydrogen chloride, in a two-fold, preferably five-fold, molar excess or more, based on the magnesium-containing compound, is then added with constant stirring. After from about 30 to 120 minutes, the solid is separated from the liquid phase.

In the second step, the product obtained in this way is introduced into a liquid alkane, and a $C_1$- to $C_8$-alkanol, in particular ethanol, a halide or an alkoxide of trivalent or tetravalent titanium, in particular titanium tetrachloride, and an electron-donor compound, in particular a phthalic acid derivative of the formula II, are then added. From 1 to 5 mol, in particular from 2 to 4 mol, of alkanol, from 2 to 20 mol, in particular from 4 to 10 mol, of trivalent or tetravalent titanium and from 0.01 to 1 mol, in particular from 0.1 to 1.0 mol, of the electron-donor compound are employed per mole of magnesium in the solid obtained from the first step. This mixture is stirred for one hour or more at from 10° to 150° C., and the resultant solid is subsequently filtered off and washed with a liquid alkane, preferably hexane or heptane.

In the third step, the solid obtained from the second step is extracted for a few hours at from 100° to 150° C. with excess titanium tetrachloride or an excess of a solution of titanium tetrachloride in an inert solvent, preferably an alkylbenzene, the solvent containing 5% by weight or more of titanium tetrachloride. The product is then washed with a liquid alkane until the content of titanium tetrachloride in the washings is less than 2% by weight.

The titanium-containing solid component obtainable in this way is used with a cocatalyst as the Ziegler-Natta catalyst system. Suitable cocatalysts here are aluminum compounds and electron-donor compounds.

Suitable aluminum compounds are trialkylaluminum and compounds in which an alkyl has been replaced by alkoxy or halogen, for example by chlorine or bromine. Preference is given to trialkylaluminum compounds whose alkyl groups each have from 1 to 8 carbon atoms, for example trimethylaluminum, triethylaluminum or methyldiethylaluminum.

In addition to the aluminum compound, preference is given as a further cocatalyst to electron-donor compounds, such as monofunctional or polyfunctional carboxylic acids, carboxylic anhydrides and carboxylic esters, furthermore ketones, ethers, alcohols, lactones and organophosphorus and organosilicon compounds. Particularly preferred electron-donor compounds here are organosilicon compounds of the general formula III $$R^1{}_n Si(OR^2)_{4-n} \qquad \text{III}$$

where $R^1$ is identical or different $C_1$- to $C_{20}$-alkyl, 5- to 7-membered cycloalkyl, which may itself carry $C_1$- to $C_{10}$-alkyl, or $C_6$- to $C_{20}$-aryl or -arylalkyl, $R^2$ is identical or different $C_1$- to $C_{20}$-alkyl, and n is 1, 2 or 3. Particular preference is given to compounds in which $R^1$ is $C_1$- to $C_8$-alkyl or 5- to 7-membered cycloalkyl, $R^2$ is $C_1$- to $C_4$-alkyl, and n is 1 or 2.

Of these compounds, dimethoxydiisopropylsilane, dimethoxyisobutylisopropylsilane, dimethoxydiisobutylsilane, dimethoxydicyclopentylsilane and diethoxyisobutylisopropylsilane should be particularly emphasized.

Preference is given to catalyst systems in which the atomic ratio between aluminum from the aluminum compound and titanium from the titanium-containing solid component is from 1:1 to 800:1, in particular from 2:1 to 200:1, and the molar ratio between the aluminum compound and the electron-donor compound employed as cocatalyst is from 1:1 to 100:1, in particular from 2:1 to 80:1. The catalyst constituents may be introduced into the polymerization system individually in any desired sequence or as a mixture of the components.

Catalyst systems of this type can be used to prepare the polymer a) to be employed according to the invention. In a preferred preparation process, propylene is polymerized in a first step, and a mixture of propylene and one or more $C_2$-$C_{10}$-alk-1-enes is polymerized onto the resultant propylene homopolymer in a second step.

The polymerization of the propylene in the first step is carried out at from 20 to 40 bar, at from 60° to 90° C. and at a mean residence time of the reaction mixture of from 1 to 5 hours, preferably at from 20 to 35 bar, from 65° to 85° C. and at a mean residence time of from 1.5 to 4 hours. The reaction conditions are preferably selected in such a manner that from 0.05 to 2 kg, preferably from 0.1 to 1.5 kg, of polypropylene are formed per mmol of the aluminum component in the first polymerization step.

When the reaction is complete, this polypropylene is discharged from the first polymerization step together with the catalyst and transferred into the second polymerization step, where a mixture of propylene and one or more $C_2$–$C_{10}$-alk-1-enes is polymerized on. The pressure prevailing in the second polymerization step is 7 bar, preferably 10 bar, below that in the first polymerization step and is from 5 to 30 bar, preferably from 10 to 25 bar. The temperature is from 30° to 100° C., preferably from 35° to 80° C., and the mean residence time of the polymer is from 1 to 5 hours, preferably from 1.5 to 4 hours. In this second polymerization step, the ratio between the partial pressures of propylene and the copolymerized $C_2$–$C_{10}$-alk-1-enes is set at from 0.1:1 to 10:1. It should furthermore be ensured, through a suitable choice of the reaction parameters, that the weight ratio between the monomers reacted in the first and second polymerization steps is from 0.2:1 to 20:1, in particular from 0.4:1 to 15:1.

The partially crosslinked polymer compositions according to the invention also contain, as crosslinking agent, an organosilane compound b) of the formula (I)

  (I)

where A are identical or different acrylates, methacrylates or vinyl groups, R are identical or different $C_1$–$C_8$-alkoxy or $C_1$–$C_8$-acetoxy groups, and n is 1, 2 or 3. Preferred organosilane compounds b) are those in which R is a $C_1$–$C_8$-alkoxy group and n is 3. Of these compounds, 3-methylacryloxypropyltrimethoxysilane, vinyltrimethoxysilane and vinyltriethoxysilane should be particularly emphasized. In small amounts, esters of acrylic or methacrylic acid can be used as further crosslinking agents in addition to the organosilane compound b).

The partially crosslinked polymer composition according to the invention is obtainable by reacting the polymer a) with the organosilane compound b) in the presence of a free-radical initiator and in the presence of a condensation catalyst at from 180° to 280° C., at from 1 to 100 bar and at a mean residence time of the reaction mixture of from 0.2 to 10 minutes. The reaction is preferably carried out at from 190° to 260° C., at from 1 to 50 bar and at a mean residence time of from 0.2 to 5 minutes. The reaction of the individual components is carried out in the apparatuses usually employed in plastics processing for combining materials, for example in drum mixers, mills, screw or disk extruders, roll mills or kneaders.

The free-radical initiator employed is preferably an organic peroxide or an azo compound. Preference is given to organic peroxide compounds which have a half value period of from 1 to 30 seconds at 210° C. Of these compounds, dicumyl peroxide, monocumyl tert-butyl peroxide, di(tert-butyl) peroxide, 2,5-dimethyl-2,5-di(-tert-butylperoxy)hexane and 2,5-dimethyl-2,5-di(tert-butylperoxy)-3-hexyne should be particularly emphasized.

Suitable condensation catalysts are, in particular, carboxylic acid salts of tin, iron, lead, zinc or titanium, the carboxylic acid salts of tin being preferred. Particularly suitable compounds are dibutyltin dilaurate, dibutyltin diacetate and dibutyltin octanoate. In addition, it is also possible to employ chelates of titanic acid or alkylamines. In order to accelerate the reaction of the polymer a) with the organosilane compound b), water or a water-releasing agent, for example a hydrate, can also be added to the reaction mixture.

The partially crosslinked polymer composition according to the invention is preferably prepared using, per 100 parts by weight of the polymer a), from 0.1 to 5 parts by weight of the organosilane compound b), from 0.001 to 2 parts by weight of the free-radical initiator and from 0.001 to 0.1 part by weight of the condensation catalyst. Partial crosslinking of the polymer a) takes place.

In a particularly preferred preparation process, appropriate amounts of the organosilane compound b), the free-radical initiator and the condensation catalyst are added to the polymer a), immediately after this preparation, in a mixing apparatus connected to the preparation reactor. The mixing apparatus used is preferably an extruder. When the reaction is complete, the partially crosslinked polymer composition is discharged from the mixing apparatus and separated from volatile starting materials in a power dryer connected thereto. The polymer composition obtained in this way can be processed further directly.

Through the choice of the specific polymer a) and organosilane compound b), a partially crosslinked polymer composition which has high mechanical strength, in particular high notched impact strength, increased puncture resistance and improved weld strength which, in contrast to fully crosslinked polymers, can also be readily processed, are obtained. The partially crosslinked polymer compositions according to the invention are obtainable in a very simple manner since both the grafting and the subsequent partial crosslinking can be carried out in a single preparation step.

Due to their relatively good processing properties, the partially crosslinked polymer compositions according to the invention are particularly suitable as materials for injection molding, blow molding, extrusion and the production of foams. They can be used to produce moldings, films and coating materials.

EXAMPLES

Examples 1–7 and comparative examples A–C were carried out in a Berstorff twin-screw extruder having a length:diameter ratio of 33. The polymer a) used was fed to the extruder as granules and melted therein with the respective organosilane compound b), the free radical initiator and the condensation catalyst.

EXAMPLE 1

100 parts by weight of a propylene polymer containing 55% by weight of propylene homopolymer and 45% by weight of propylene-ethylene copolymer [determined by extraction fractionation by the method of W. Holtrup, Makromol. Chem. 178, (1977) 2335] and having an ethylene content of 23% by weight, based on the total polymer [determined by infra-red spectroscopy] and a melt flow index of 2.1 g/10 min [at 230° C. and 2.16 kg, in accordance with DIN 53 735] were mixed in the twin-screw extruder with 0.875 part by weight of vinyltrimethoxysilane, 0.075 part by weight of dicumyl peroxide and 0.05 part by weight of dibutyltin dilaurate, and the mixture was granulated. The temperature was 220° C., the pressure 20 bar and the mean residence time 30 seconds. The mixture was then discharged from the extruder and heated for 8 hours in a water bath at 95° C.

The melt flow index and the Izod notched impact strength of the resultant partially crosslinked polymer composition are given in Table 1 below.

EXAMPLE 2

100 parts by weight of the propylene polymer used in Example 1 were mixed under the same conditions as in Example 1 with 0.80 part by weight of vinyltrimethoxysilane, 0.15 part by weight of 2,5-dimethyl-2,5-di(tert-butylperoxy)hexane and 0.05 part by weight of dibutyltin dilaurate, and the mixture was worked up appropriately.

The melt flow index and the Izod notched impact strength of the resultant partially crosslinked polymer composition are given in Table 1 below.

EXAMPLE 3

100 parts by weight of the propylene polymer used in Example 1 were mixed under the same conditions as in Example 1 with 0.45 part by weight of vinyltrimethoxysilane, 0.04 part by weight of 2,5-dimethyl-2,5-di(tert-butylperoxy)hexane and 0.025 part by weight of dibutyltin dilaurate, and the mixture was worked up appropriately.

The melt flow index and the Izod notched impact strength of the resultant partially crosslinked polymer composition are given in Table 1 below.

COMPARATIVE EXAMPLE A

The procedure of Example 1 was repeated using the same amount of propylene polymer under the same conditions, but without addition of a crosslinking system comprising an unsaturated organosilane, a free-radical initiator and a condensation catalyst.

The melt flow index and the Izod notched impact strength of the resultant polymer composition are given in Table 1 below.

TABLE 1

| | Examples | | | |
|---|---|---|---|---|
| | 1 | 2 | 3 | A |
| Melt flow index[a] [g/10 min] | 0.2 | 0.6 | 0.4 | 2.1 |
| Izod notched impact strength[b] [kJ/m$^2$] | 69 | 72 | 75 | 22 |

[a]Measured in accordance with DIN 53 735, at 230° C. under a weight of 2.16 kg
[b]Measured in accordance with ISO 180, method 1A, at −30° C. using injection-molded specimens of Type 1A. The temperature during these measurements was 250° C,. and the melt front speed was 200 mm/sec. Before the Izod notched impact strength was determined, the specimens were stored at room temperature for at least one week.

EXAMPLE 4

100 parts by weight of the propylene polymer used in Example 1 were mixed with 0.80 part by weight of Ucarsil ® PC2A and 0.20 part by weight of Ucarsil ® PC1B (crosslinking agent from Union Carbide Corporation), and the mixture was worked up as in Example 1.

The melt flow index and the results of penetration experiments (fracture energy and penetration energy) on the resultant partially crosslinked polymer composition are given in Table 2 and are compared with the corresponding values for the polymer compositions obtained from Comparative Experiment A.

TABLE 2

| | Example 4 | Comparative Example A |
|---|---|---|
| Melt flow index[a] [g/10 min] | 0.6 | 2.1 |
| Fracture energy[b] [J] at | | |
| 23° C. | 24.8 | 18.6 |
| 0° C. | 26.3 | 20.6 |
| −20° C. | 34.2 | 29.2 |

TABLE 2-continued

| | Example 4 | Comparative Example A |
|---|---|---|
| −40° C. | 32.4 | 26.4 |
| Penetration energy[b] [J] at | | |
| 23° C. | 26.7 | 20.1 |
| 0° C. | 27.8 | 22.5 |
| −20° C. | 35.1 | 30.3 |
| −40° C. | 33.6 | 27.6 |

[a]Measured in accordance with DIN 53 735, at 230° C. under a weight of 2.16 kg
[b]The results of the penetration tests (fracture energy and penetration energy) were carried out in accordance with DIN 53 443, Part 2, using disks with a diameter of 60 mm and a thickness of 2 mm injection-molded from the appropriate polymer composition and produced at 250° C. and a melt front speed of 200 mm/sec. Before the measurements, the specimens were stored at 130° C. for 500 hours.

EXAMPLE 5

100 parts by weight of a propylene polymer containing 55% by weight of propylene homopolymer and 45% by weight of propylene-ethylene copolymer [determined by extraction fractionation by the method of W. Holtrup, Makromol. Chem. 178, (1977), 2335] and having an ethylene content of 23% by weight, based on the total polymer [determined by infra-red spectroscopy], and a melt flow index of 10.4 g/10 min [at 230° C. and 2.16 kg, in accordance with DIN 53 735]were mixed in the twin-screw extruder with 0.40 part by weight of Ucarsil ® PC2A and 0.20 part by weight of Ucarsil PC1B ® (crosslinking agent from Union Carbide Corporation) and with 0.1 part by weight of 2,5-dimethyl-2,5-di(tert.butylperoxy)hexane and 0.05 part by weight of dibutyltin dilaurate. The reaction and work-up were carried out by a method similar to that of Example 1.

The melt flow index and the results of elongation tests (elongation at stress yield and elongation at break) on the resultant partially crosslinked polymer compositions are shown in Table 3 below.

COMPARATIVE EXAMPLE B

Example 5 was repeated using the same amount of the propylene polymer under the same conditions, but without addition of a crosslinking system comprising an unsaturated organosilane, a free-radical initiator and a condensation catalyst.

The melt flow index and the results of elongation tests (elongation at stress yield and elongation at break) of the resultant polymer composition are shown in Table 3 below.

EXAMPLE 6

100 parts by weight of the propylene polymer used in Example 1 were mixed under the same conditions as in Example 1 with 0.8 part by weight of vinyltriethoxysilane, 0.375 part by weight of 2,5-dimethyl-2,5-di(tert-butylperoxy)hexane and 0.1 part by weight of dibutyltin dilaurate, and the mixture was worked up appropriately.

The melt flow index and the results of elongation tests (elongation at stress yield and elongation at break) on the resultant partially crosslinked polymer composition are shown in Table 3 below.

EXAMPLE 7

100 parts by weight of a propylene polymer containing 82% by weight of propylene homopolymer and 18% by weight of propylene-ethylene copolymer and having an ethylene content of 10% by weight, based on the total polymer, and a melt flow index of 2.0 g/10 min [at 230° C. and 2.16 kg, in accordance with DIN 53 735] were mixed in the twin-screw extruder with 0.91 part by weight of vinyltrimethoxysilane, 0.04 part by weight of 2,5-dimethyl-2,5-di(tert-butylperoxy)hexane and 0.05 part by weight of dibutyltin dilaurate, and the mixture was worked up as described in Example 1.

The melt flow index and the results of elongation tests (elongation at stress yield and elongation at break) on the resultant partially crosslinked polymer composition are shown in Table 3 below.

COMPARATIVE EXAMPLE C

Example 7 was repeated using the same amount of the propylene polymer under the same conditions, but without addition of a crosslinking system comprising an unsaturated organosilane, a free-radical initiator and a condensation catalyst.

The melt flow index and the results of elongation tests (elongation at stress yield and elongation at break) on the resultant polymer composition are shown in Table 3 below.

TABLE 3

|  | Examples | | | Comparative Examples | |
|---|---|---|---|---|---|
|  | 5 | 6 | 7 | B | C |
| Melt flow index[a] [g/10 min] | 1.9 | 5.5 | 6.2 | 10.4 | 2.0 |
| Elongation at stress yield[b] with weld line [%] | 11 | 15 | 6 | 3 | 3 |
| Elongation at break[b], with weld line [%] | 41 | 30 | 22 | 12 | 3 |

[a] Measured in accordance with DIN 53 735, at 230° C. under a weight of 2.16 kg
[b] For the elongation testing with a weld line, dumbbell specimens molded-on on both sides with a weld line in the center transverse to the longitudinal axis were produced. The dimensions of the dumbbell specimens corresponded to the standard dumbbell specimen Type 1 of ISO 527 and had a thickness of 3 mm. The specimens were produced at 250° C. and a melt front speed of 200 mm/sec.

Tensile experiments in accordance with DIN 53 457 were carried out at 23° C. on the dumbbell specimens produced in this way to determine the elongation at stress yield and the elongation at break, in each case with weld line.

We claim:

1. A partially crosslinked polymer composition having a melt flow index of from 0.1 to 50 g/10 :min at 230° C. under a weight of 2.16 kg and comprising
    a) a polymer comprising from 25 to 95% by weight of polypropylene and 5 to 75% by weight of a propylene copolymer with copolymerized $C_z$-$C_m$-alk-1-enes, the comonomer content being from 1 to 45% by weight, based on the total polymer,
    b) an organosilane compound of the formula (I)

$$A_{4-n}SiR_n \qquad (I)$$

where A are identical or different acrylates or methacrylates or vinyl groups, R are identical or different $C_1$-$C_8$-alkoxy or $C_1$-$C_8$-acetoxy groups, and n is 1, 2 or 3, obtained by reacting the polymer a) with the organosilane compound b) in the presence of a free-radical initiator and in the presence of a condensation catalyst at from 180 to 280° C., at from 1 to 100 bar and at a mean residence time of the reaction mixture of from 0.2 to 10 minutes.

2. A partially crosslinked polymer composition as claimed in claim 1, where 0.1 to 5 parts per weight of the organosilane compound b), from 0.001 to 2 parts by weight of the free-radical initiator and from 0.001 to 0.1 part by weight of the condensation catalyst are used per 100 parts by weight of the polymer a).

3. A partially crosslinked polymer composition as claimed in claim 1, where the polymer a) comprises from 35 to 90% by weight of polypropylene and from 10 to by weight of a propylene copolymer.

4. A partially crosslinked polymer composition as claimed in claim 1, in whose organosilane compound H is $C_1$-$C_8$-alkoxy and n is 3.

5. A process for the preparation of a partially crosslinked polymer composition as claimed in claim 1, which comprises adding the organosilane compound b) and the free-radical initiator and the condensation catalyst to the polymer a) immediately after preparation of the latter, in a mixing apparatus connected to the preparation reactor.

* * * * *

UNITED STATES PATENT AND TRADEMARK OFFICE
CERTIFICATE OF CORRECTION

PATENT NO. : 5,244,976
DATED : Sep. 14, 1993
INVENTOR(S) : BROSIUS et al.

It is certified that error appears in the above-identified patent and that said Letters Patent is hereby corrected as shown below:

Claim 1, column 10, line 5, ":min" should read --min--.

column 10, lines 9-10, "$C_2$-$C_m$-alk-1-enes" should read --$C_2$-$C_{10}$-alk-1-enes--.

Claim 3, column 10, line 34, between "to" and "by" insert --65%--.

Claim 4, column 10, line 36, "H" should read --R--.

Signed and Sealed this

Twenty-ninth Day of March, 1994

Attest:

BRUCE LEHMAN

*Attesting Officer*      *Commissioner of Patents and Trademarks*